United States Patent [19]

Fukuda et al.

[11] Patent Number: 4,884,879
[45] Date of Patent: Dec. 5, 1989

[54] LENS SYSTEM FOR PROJECTION TELEVISION RECEIVERS

[75] Inventors: Kyohei Fukuda, Fujisawa; Soichi Sakurai; Koji Hirata, both of Yokohama; Shigeru Mori, Chigasaki, all of Japan

[73] Assignee: Hitachi, Ltd., Tokyo, Japan

[21] Appl. No.: 911,070

[22] Filed: Sep. 24, 1986

[30] Foreign Application Priority Data

Sep. 25, 1985 [JP] Japan .................................. 60-210231
Jan. 29, 1986 [JP] Japan .................................. 61-15937

[51] Int. Cl.$^4$ .......................... G02B 13/18; G02B 9/34
[52] U.S. Cl. .................................. 350/432; 350/412; 350/473
[58] Field of Search .................. 350/412, 432–435, 350/473

[56] References Cited

U.S. PATENT DOCUMENTS

| | | | |
|---|---|---|---|
| 4,620,773 | 11/1986 | Kukuda | 350/412 X |
| 4,682,862 | 7/1987 | Moskovich | 350/412 X |
| 4,685,774 | 8/1987 | Moskovich | 350/412 X |
| 4,697,892 | 10/1987 | Betensky | 350/412 X |
| 4,699,476 | 10/1987 | Clarke | 350/412 X |
| 4,707,084 | 11/1987 | Betensky | 350/412 X |

Primary Examiner—Scott J. Sugarman
Attorney, Agent, or Firm—Antonelli, Terry & Wands

[57] ABSTRACT

An optical system of a projection television receiver for projecting pictures from a picture tube onto a screen, comprising a fluorescent face constituting the tube face of the receiver tube having a nonspherical shape in such a direction as to compensate the curve of the image face of the projected picture on the screen, and further comprising lenses arranged from the screen side to the tube face of the picture tube in the order of:

(A) a first lens having relatively weak power (reciprocal of focal distance) and having a nonspherical shape at least at one face;
(B) a second lens having relatively strong positive power;
(C) a third lens having relatively weak power and having a nonspherical shape at least at one face; and
(D) a fourth lens having relatively strong negative power and having a concave shape at the face of the screen side.

24 Claims, 7 Drawing Sheets

LENS SYSTEM FOR PROJECTION TELEVISION RECEIVERS

BACKGROUND OF THE INVENTION

The present invention relates to a projection television optical system for projecting pictures from a picture tube in a projection television receiver onto a screen.

A demand for increase in the size of the picture reproduction face of a television receiver aiming at powerful pictures which cannot be obtained on a small-sized picture plane has been intensified. Thus so-called projection television receivers have been widely brought into use. In the projection television receiver, pictures reproduced on the fluorescent face of a Braun tube (picture tube) are enlarged and projected onto a screen by a projection optical system including lenses and mirrors, pictures being obtained in a large picture plane.

As a result of various improvements heretofore applied to such projection television receivers, a great advance is found as compared with several years ago. Lenses play a very important role in this projection television receiver.

Lenses according to a proposal disclosed in U.S. Pat. No. 4,348,081 or 4,300,817 provide high luminance which is 1.0 in F number although only three sheets of lens are used. This is achieved by the design utilizing at its maximum the fact that the plastic lens can be easily formed to a nonspherical shape.

It is no exaggeration to say that the projection television receiver is greatly developed owing to the lens disclosed in the aforementioned U.S. Patents. Under the existing circumstances, however, the projection television receivers are still inferior to the direct-view television receivers in picture quality, compactness and price.

Respective problems will now be described.

(1) Picture quality: Important picture quality terms of the projection television receiver are focus, brightness and contrast. The focus of a lens can be generally estimated by using the MTF (modulation transfer function). As a result of estimating the lens described in the aforementioned U.S. Pat. No. 4,348,081, the focus was very fine at the central portion of the picture plane. In the actual Braun tube, however, the luminous spectrum characteristics of the fluorescent substance have a discrete distribution. By taking this into consideration, the MTF is worsened. Especially in the low frequency region, the MTF of the lens is inferior to that of the glass lens generally used.

This is caused by the fact that regard to improvement of the color aberration is not paid in the lens according to the proposal described in the aforementioned U.S. Patent. If the color aberration was improved, the MTF would be largely improved.

Since all of the lenses according to the aforementioned proposal are composed of plastic lens, a change in temperature causes a change in refractive index, resulting in focus deterioration.

In order to increase the input power of the projection tube and improve its brightness, so-called liquid-cooled Braun tubes are recently used. In these liquid-cooled Braun tubes, the heat generated by increase in input power is cooled down. The heat is radiated from a radiation fin by the convection of the liquid to reduce and make uniform the temperature of the glass of the fluorescent face, the glass of the fluorescent face being prevented from breaking due to high temperature.

(2) Compactness: In order to achieve compactness, the number of sheets of mirror in the set has heretofore been increased. Under the existing circumstances, however, the number of sheets in use has already reached its limit. For achieving further compactness, therefore, the projection distance and the lens length must be shortened. At the same time, the mirror arrangement must also be reconsidered.

In this connection, the projection distance and the lens length of the lens according to the proposal described in U.S. Pat. No. 4,348,081 are respectively 1,200 to 1,300 mm and approximately 200 mm when a screen of 45 inches is used and the magnification is 9 to 10.

(3) Price: As described above, the conventional projection television set has problems such as a complicated mirror arrangement, large lens dimensions, use of a liquid-cooled Braun tube, and a complicated coupling structure between the Braun tube and the concave lens. As a result, the high cost is inevitable.

SUMMARY OF THE INVENTION

An object of the present invention is to provide an optical system for projection television receiver capable of shortening the projection distance and the lens length, improving the picture quality such as focus, brightness and contrast, realizing a compact projection television set, and reducing the cost.

In order to achieve the above described object, an optical system according to the present invention is composed of lenses having wide picture angles. That is to say, a nonspherical lens having weak power, a lens having convex faces at both sides and occupying the major portion of the entire power, a nonspherical convex lens having weak power, a concave lens having large negative power, and a fluorescent face of the Braun tube having a nonspherical shape are sequentially arranged from the screen side.

DESCRIPTION OF THE PREFERRED EMBODIMENTS

The present invention will now be described in detail by referring to embodiments.

In accordance with the present invention, the focal distance is largely reduced as compared with the prior art in order to solve the above described problems. Although the magnification is approximately the same as that of the prior art, the picture angle is largely widened to 45° from approximately 25° of the prior art.

In general, such a large picture angle makes the lense design very difficult. In particular, it becomes difficult to make the brightness and focus of the periphery portion have desired performance values. If, on the contrary, the picture angle can be increased and the projection distance can be shortened, the focal distance can also be shortened. In this case, the reduced color aberration results in an improved focus and a small-sized set. And the small-sized lens results in a reduced cost.

In case of the lens of the type disclosed in U.S. Pat. No. 4,348,081, much consideration is not paid to the color aberration on the central axis. In general, the color aberration on the axis is improved by combining a concave lens and a convex lens having which are different each other in dispersion. In case of a projection television receiver, however, color aberration does not pose a hard problem as compared with other optical devices such as a still camera, because red, blue and green monochromatic Braun tubes are used.

Figure 17:
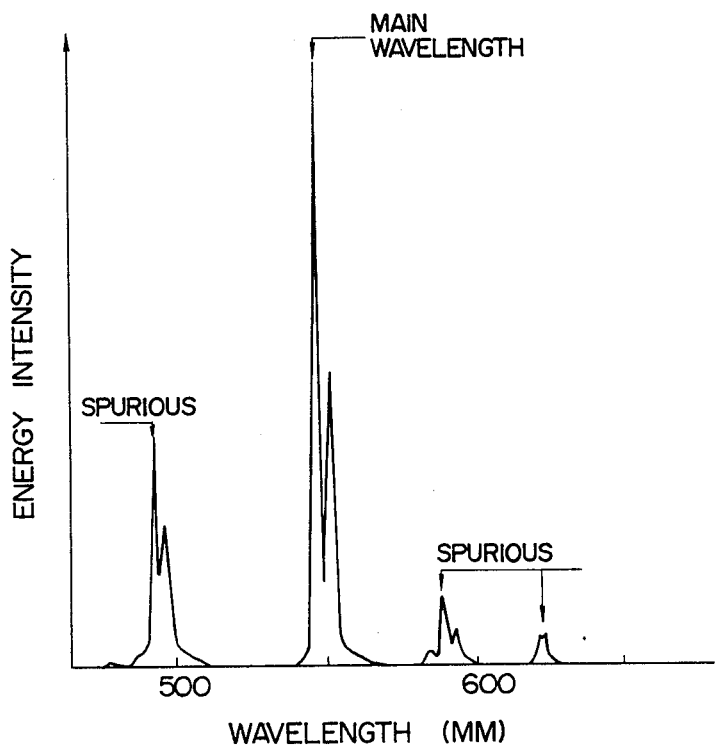
FIG. 17 is a luminous spectral characteristic diagram of a fluorescent substance.

In reality, however, the luminous distribution of the fluorescent substance is not a bright line completely. (See FIG. 17.) In the type described in U.S. Pat. No. 4,348,081, the increment Δd in spot diameter caused by color aberration at the center of the screen is represented as $\Delta d = (1+M)^2 \cdot f / F \cdot M \cdot \Delta N / N - 1$ $$\Delta d = \frac{(1+M)^2 \cdot f}{F \cdot M} \cdot \frac{\Delta N}{N-1}$$

where M, F, f and N are magnification, F number, focal distance and refractive index, respectively.

It is seen from the expression that Δd is reduced in proportion to the focal distance.

Figure 1:
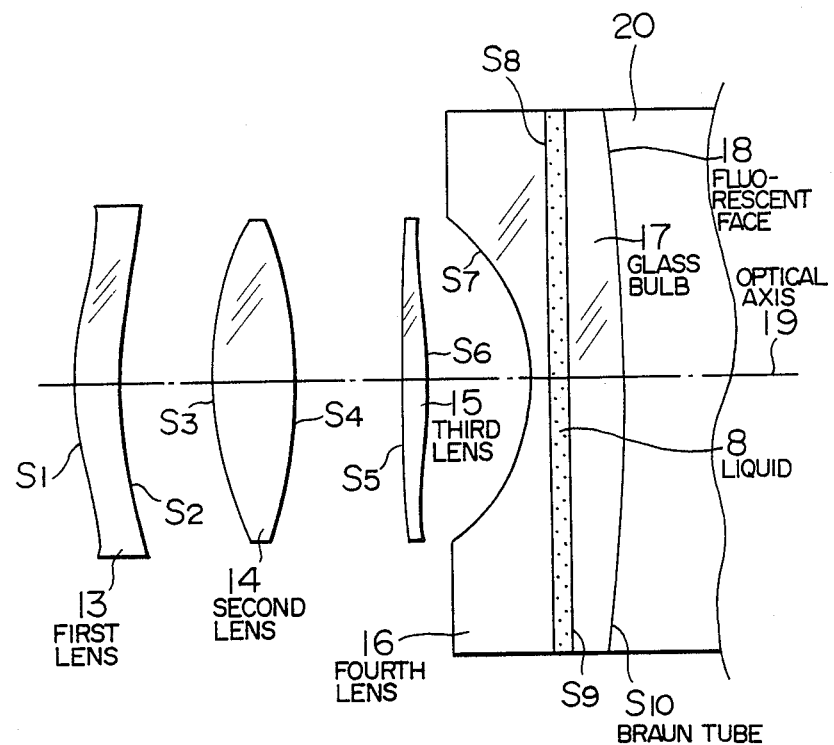
FIG. 1 is a sectional view illustrating an embodiment of the present invention.

FIG. 1 is a sectional view illustrating an embodiment of an optical system for projection television receiver according to the present invention. A first lens 13, a second lens 14, a third lens 15, a fourth lens 16, a glass bulb 17, a fluorescent face 18, an optical axis 19, a Braun tube 20, and liquid 8 are shown in FIG. 1.

The embodiment illustrated in FIG. 1 includes the first lens 13 composed of a nonspherical lens having weak power (the reciprocal of the focal distance), the second lens 14 composed of a lens having convex surfaces at both sides and occupying the major portion of the power of the whole optical system, the third lens 15 composed of a nonspherical convex lens having weak power, the fourth lens 16 composed of a concave lens having large negative power, and the fluorescent face 18 of the Braun tube having a spherical or nonspherical shape are arranged in this order from the side of the screen which is not illustrated. While the glass bulb 17 has a flat face at the side of liquid 8, the fluorescent face 18 opposing thereto has a spherical or nonspehrical shape.

The lens data of respective lenses arranged as shown in FIG. 1 will now be described.

Table 1 shows concrete examples of those lens data.

TABLE 1

| Paraxial system | | Radius of Curvature (RD) | Clap Radius | Space Between Faces | Refractive Index |
|---|---|---|---|---|---|
| Screen | | ∞ | 600 | | |
| | | | | 701.0 | 1.0 |
| First Lens | $S_1$ | 92.9391 | 37.0 | | |
| | | | | 7.0487 | 1.4936 |
| | $S_2$ | 123.690 | 35.5 | | |
| | | | | 16.5904 | 1.0 |
| Second Lens | $S_3$ | 86.300 | 34.0 | | |
| | | | | 17.3 | 1.62286 |
| | $S_4$ | −101.822 | 32.0 | | |
| | | | | 29.6586 | 1.0 |
| Third Lens | $S_5$ | 181.3277 | 34.0 | | |
| | | | | 8.012 | 1.4936 |
| | $S_6$ | −152.796 | 34.0 | | |
| | | | | 17.6 | 1.0 |
| Fourth Lens | $S_7$ | −40.234 | 34.5 | | |
| | $S_8$ | | | 3.0 | 1.5401 |
| | | ∞ | 60.0 | | |
| Cooling Liquid | | | 4.2 | 1.41 | |
| | | ∞ | 60.0 | | |
| Glass | | | 13.8 | 1.5401 | |
| Fluorescent Face $S_{10}$ | | −119.63 | 60.0 | | |

| Aspherical coefficients | | CC | AD | AE | AF | AG |
|---|---|---|---|---|---|---|
| First Lens | | | × 10⁻⁶ | × 10⁻⁹ | × 10⁻¹² | × 10⁻¹⁶ |
| | $S_1$ | −6.3741 | −1.7690 | −3.4450 | 2.5723 | −5.3853 |
| | | | × 10⁻⁶ | × 10⁻⁹ | × 10⁻¹² | × 10⁻¹⁶ |
| | $S_2$ | 0.2738 | −1.8085 | −2.5767 | 2.6339 | −5.7156 |
| Third Lens | | | × 10⁻⁶ | × 10⁻¹⁰ | × 10⁻¹³ | × 10⁻¹⁷ |
| | $S_5$ | −138.085 | 1.8057 | −7.4569 | −5.7472 | 7.5759 |
| | | | ×10⁻⁸ | × 10⁻⁹ | × 10⁻¹² | × 10⁻⁶ |
| | $S_6$ | −1.8908 | 4.8071 | 1.2516 | −1.4590 | 1.5522 |
| Fluorescent Face | | | × 10⁻⁷ | × 10⁻¹¹ | × 10⁻¹⁵ | × 10⁻¹⁶ |

TABLE 1-continued

| | | | | | |
|---|---|---|---|---|---|
| $S_{10}$ | −3.0554 | 8,4036 | 8.036 | −6.4008 | 6.4367 |

In this table, data are shown separately for the near axis system handling the lens area located near the optical axis and for the nonspherical system handling the peripheral portion.

As evident from Table 1, the screen which is not illustrated is ∞ in radius of curvature. (That is to say, the screen is a flat phase.) The effective radius (clap radius) assured in the optical performance is 600 mm. The distance on the optical axis from the screen face to the face Sl of the first lens 13 (denoted by the term "space between faces") is 701.0 mm. The refractive index (of the air) between those faces is 1.0.

It is also shown that the face S1 of the first lens 13 has a radius of curvature of 92.9391 mm. The clap radius (effective radius in the view of optical performance) is 37.0 mm. The space on the optical axis between the lens faces Sl and S2 (represented as "space between faces") is 7.0487 mm. The refractive index between those faces is shown to be 1.4936.

In the same way, the fluorescent face 18 (S10) of the glass bulb 17 is −119.63 mm in radius of curvature and 60.0 mm in clap radius. The glass bulb 17 has thickness of 13.8 mm on the optical axis and refractive index of 1.5401.

Nonspherical coefficients are shown for faces S1 and S2 of the first lens 13, faces S5 and S6 of the third lens 15, and the fluorescent face 18 (S10).

Figure 2:
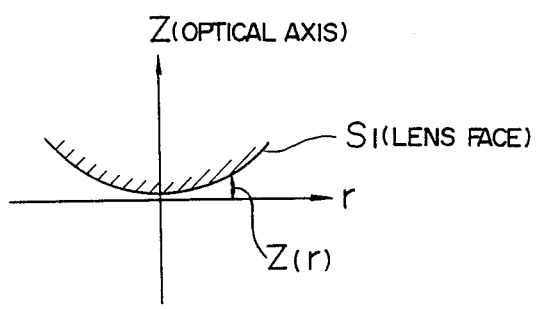
FIG. 2 is a diagram for illustrating the definition of the face shape.
Figure 3:
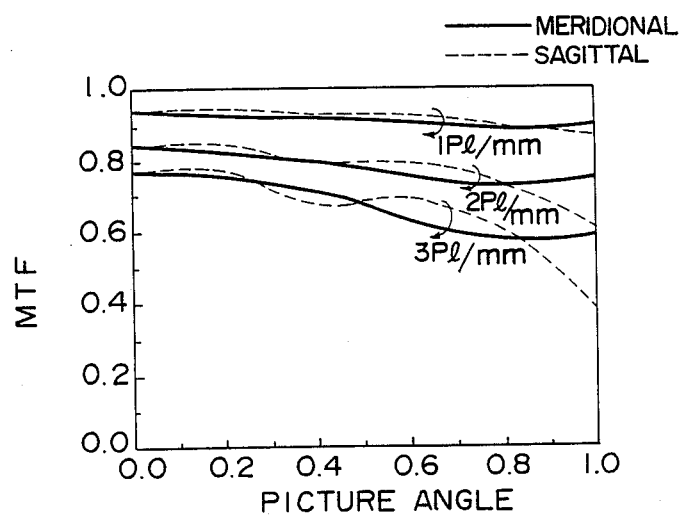
FIGS. 3 to 6 are characteristic diagrams illustrating MTF characteristics of embodiments according to the present invention.
Figure 4:
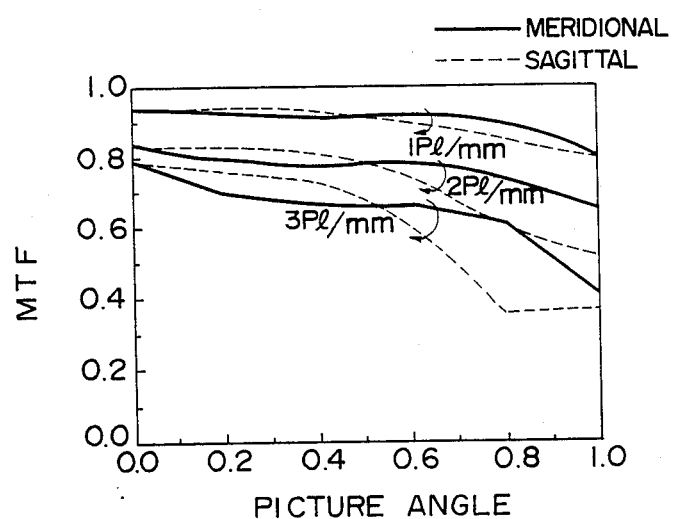
Figure 5:
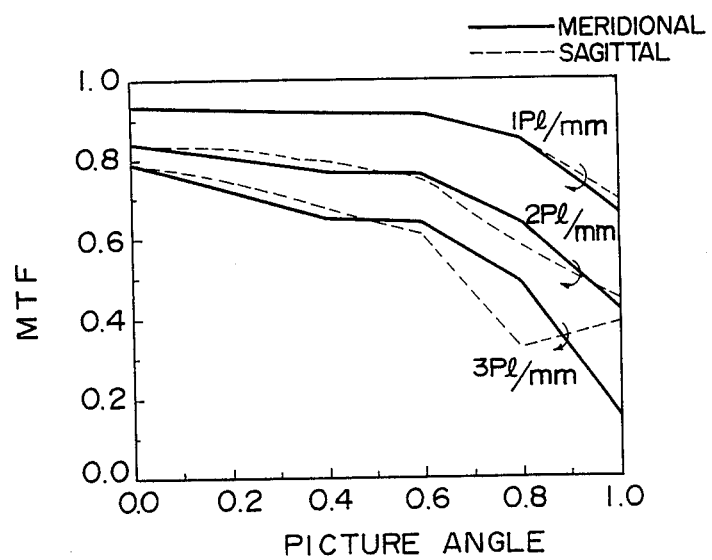
Figure 6:
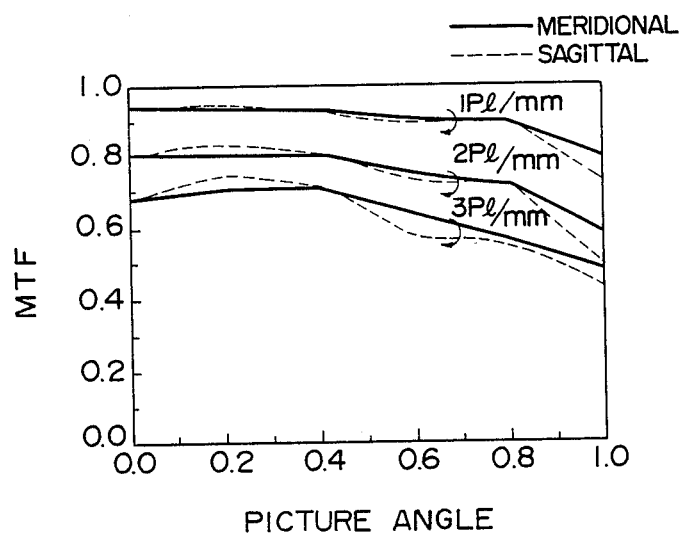

The nonspherical coefficients are coefficients obtained when the face shape is represented as $$Z = \frac{r^2/R_D}{1 + \sqrt{1 - (CC) \cdot r^2/R_D^2}} + AD \cdot r^4 + AE \cdot r^6 + AF \cdot r^8 + AG \cdot r^{10}$$

where Z represents the height of the lens face (as a function of r) when the direction of the optical axis is taken as the Z axis and the radial direction of the lens is taken as the r axis as shown in FIG. 2, and r and $R_D$ represent the distance in the radial direction and the radius of curvature, respectively. It coefficients CC, DD, AE, AF and AG are given, therefore, the height, i.e., the shape of the lens face is defined by the above expression.

The contents of the data shown in Table 1 are understood by the above description.

Since the second lens 14 and the fourth lens 16 of FIG. 1 are spherical lenses, all of their nonspherical coefficients are zero.

Tables 2 to 4 show concrete examples of other lens data.

Interpretation of these tables is the same as that of Table 1 and hence is not repetitively described.

TABLE 2

| Paraxial system | | Radius of Curvature | Clap Radius | Space Between Faces | Refractive Index |
|---|---|---|---|---|---|
| Screen | | ∞ | 600 | | |
| | | | | 701.0 | 1.0 |
| First Lens | $S_1$ | 70.4536 | 37.0 | | |
| | | | | 9.7447 | 1.4936 |
| | $S_2$ | 98.1806 | 35.5 | | |
| | | | | 19.754 | 1.0 |
| Second Lens | $S_3$ | 75.5626 | 34.0 | | |
| | | | | 17.3 | 1.62286 |
| | $S_4$ | −119.979 | 32.0 | | |
| | | | | 23.1726 | 1.0 |
| Third Lens | $S_5$ | 586.226 | 34.0 | | |
| | | | | 5.012 | 1.4936 |
| | $S_6$ | −139.059 | 34.0 | | |
| | | | | 23.0 | 1.0 |
| Fourth Lens | $S_7$ | −40.676 | 34.0 | | |
| | | | | 3.0 | 1.5401 |
| | $S_8$ | | | 3.0 | 1.5401 |
| Cooling Liquid | | | | 4.2 | 1.41 |
| | | ∞ | 60.0 | | |
| Glass | | | | 12.4 | 1.5401 |
| Fluorescent Face $S_{10}$ | | −224.52 | 60.0 | | |

| Aspherical coefficients | | CC | AD | AE | AF | AG |
|---|---|---|---|---|---|---|
| | | | × $10^{-7}$ | × $10^{-9}$ | × $10^{-13}$ | × $10^{-16}$ |
| First Lens | $S_1$ | −4.0025 | −5.6627 | −1.3450 | −2.9026 | 3.3385 |
| | | | × $10^{-7}$ | × $10^{-10}$ | × $10^{-13}$ | × $10^{-16}$ |
| | $S_2$ | −3.3752 | −4.4798 | −9.8121 | −1.5909 | 4.0946 |
| | | | × $10^{-6}$ | × $10^{-9}$ | × $10^{-12}$ | × $10^{-16}$ |
| Third Lens | $S_5$ | −3379.5 | 1.3346 | −1.9910 | 1.7181 | −6.4771 |
| | | | × $10^{-7}$ | × $10^{-10}$ | | × $10^{-17}$ |
| | $S_6$ | −31.2209 | 2.0209 | 7.2067 | −2.43 × $10^{-14}$ | 6.2240 |
| Fluorescent Face | | | × $10^{-7}$ | × $10^{-12}$ | × $10^{-14}$ | × $10^{-20}$ |
| | $S_{10}$ | −14,689 | 3.9240 | −8.312 | −1.601 | 2.4631 |

TABLE 3

| Paraxial system | | Radius of Curvature | Clap Radius | Space Between Faces | Refractive Index |
|---|---|---|---|---|---|
| Screen | | $\infty$ | 600 | | |
| | | | | 701.0 | 1.0 |
| First Lens | $S_1$ | 69.0430 | 37.0 | | |
| | | | | 9.0 | 1.4936 |
| | $S_2$ | 120.731 | 35.5 | | |
| | | | | 21.896 | 1.0 |
| Second Lens | $S_3$ | 73.7529 | 34.0 | | |
| | | | | 17.3 | 1.62286 |
| | $S_4$ | −111.438 | 32.0 | | |
| | | | | 22.758 | 1.0 |
| Third Lens | $S_5$ | −6456.544 | 34.0 | | |
| | | | | 4.012 | 1.4936 |
| | $S_6$ | −149.016 | 34.0 | | |
| | | | | 19.0 | 1.0 |
| Fourth Lens | $S_7$ | −38.0291 | 33.5 | | |
| | $S_8$ | | | 3.0 | 1.5401 |
| Cooling Liquid | | $\infty$ | 60.0 | 4.0 | 1.41 |
| Glass | | | | 11.28 | 1.5401 |
| Fluorescent Face $S_{10}$ | | −261.57 | 60.0 | | |

| Aspherical coefficients | | | CC | AD | AE | AF | AG |
|---|---|---|---|---|---|---|---|
| First Lens | $S_1$ | | −3.9269 | −5.3664 $\times 10^{-7}$ | −1.3606 $\times 10^{-9}$ | −4.1492 $\times 10^{-13}$ | 4.0028 $\times 10^{-16}$ |
| | $S_2$ | | −3.5202 | −5.7934 $\times 10^{-7}$ | −9.7981 $\times 10^{-10}$ | −3.1520 $\times 10^{-14}$ | 3.5722 $\times 10^{-16}$ |
| Third Lens | $S_5$ | | −9548.79 | 7.0702 $\times 10^{-7}$ | −1.4524 $\times 10^{-9}$ | 2.6650 $\times 10^{-12}$ | −1.5654 $\times 10^{-15}$ |
| | $S_6$ | | −11.365 | 7.5329 $\times 10^{-7}$ | 2.5017 $\times 10^{-9}$ | −1.2457 $\times 10^{-12}$ | 3.0134 $\times 10^{-16}$ |
| Fluorescent Face | $S_{10}$ | | −54.824 | 5.5130 $\times 10^{-8}$ | 3.1435 $\times 10^{-11}$ | 1.6143 $\times 10^{-14}$ | −8.0448 $\times 10^{-18}$ |

TABLE 4

| | | | Radius of Curvature | Clap Radius | Space Between Faces | Refractive Index |
|---|---|---|---|---|---|---|
| Paraxial System | Screen | | $\infty$ | 600 | | |
| | | | | | 701.0 | 1.0 |
| | First Lens | $S_1$ | 84.9930 | 37.0 | | |
| | | | | | 4.981 | 1.4936 |
| | | $S_2$ | 119.696 | 35.5 | | |
| | | | | | 21.341 | 1.0 |
| | Second Lens | $S_3$ | 85.3919 | 34.0 | | |
| | | | | | 17.3 | 1.62286 |
| | | $S_4$ | −102.165 | 32.0 | | |
| | | | | | 29.5926 | 1.0 |
| | Third Lens | $S_5$ | 509.622 | 34.0 | | |
| | | | | | 7.012 | 1.4936 |
| | | $S_6$ | −109.419 | 34.0 | | |
| | | | | | 20.0 | 1.0 |
| | Fourth Lens | $S_7$ | −40.600 | 35.0 | | |
| | | | | | 3.0 | 1.5401 |
| | | $S_8$ | $\infty$ | 60.0 | | |
| | Cooling Liquid | | $\infty$ | 60.0 | 3.0 | 1.41 |
| | Glass | | | | 14.0 | 1.5401 |
| | Fluorescent Face $S_{10}$ | | −300.0 | 60.0 | | |

| | | | CC | AD | AE | AF | AG |
|---|---|---|---|---|---|---|---|
| Aspherical coefficients | First Lens | $S_1$ | −3.7010 | −1.6725 $\times 10^{-6}$ | −3.4272 $\times 10^{-9}$ | 2.6518 $\times 10^{-12}$ | −5.4293 $\times 10^{-16}$ |
| | | $S_2$ | 2.1420 | −1.5377 $\times 10^{-6}$ | −2.5504 $\times 10^{-9}$ | 2.4882 $\times 10^{-12}$ | −4.6114 $\times 10^{-16}$ |
| | Third Lens | $S_5$ | −5149.72 | 1.0428 $\times 10^{-6}$ | −7.1879 $\times 10^{-10}$ | −2.0677 $\times 10^{-13}$ | 6.3138 $\times 10^{-16}$ |
| | | $S_6$ | −0.56697 | 6.7685 $\times 10^{-7}$ | 1.3022 $\times 10^{-9}$ | −1.6193 $\times 10^{-12}$ | 1.1021 $\times 10^{-15}$ |

In the optical system according to the present invention, it becomes possible to largely shorten the projection distance and improve the focus performance as compared with the prior art by using lenses and the Braun tube configured as heretofore described.

Features of the present invention will now be described.

All of the data shown in Tables 1 to 4 correspond to embodiments with magnification 9.5 to 10. That is to say, the raster size on the fluorescent face of the Braun tube is chosen to be 4.5 inch in diagonal line length, and it is projected onto the screen to be enlarged to 45 inch.

In reality, however, distortion of 5 to 8% exists as described later. Therefore, the magnification on the near axis assumes a value somewhat less than 10, i.e., 9.2 to 9.5.

The distance from the front end of the lens to the screen is approximately 700 mm, which is approximately 55% as compared with 1,200 to 1,300 mm of the conventional projection television receiver.

Further, these lenses have F number 1.0 and hence have very high luminance, assuming the top rank in the projection lenses available now.

In general, such as increase in picture angle increases the brightness or aberration of the peripheral portion. The present invention has solved these problems by using a method comprising the steps of attempting optimum design of lenses and providing the fluorescent face of the Braun tube with curvature.

The peripheral light quantity $I_c$ is generally given by $$I_c \propto V \cdot \cos^4\theta$$

where $\theta$ is the picture angle and V is vignetting. The value of $\cos^4\theta$ for picture angle of 40° is nearly half that for picture angle of 25°.

In order to compensate the resulting deterioration of the light quantity, vignetting of the present invention is increased to twice as compared with the conventional case where the picture angle is 25°. Thus the synthetic peripheral light quantity is maintained at a value not less than that of the prior art. The focus characteristics estimated by using MTF are shown in FIGS. 3 to 6.

That is to say, FIGS. 3 to 6 are characteristic diagrams corresponding to Tables 1 to 4, respectively.

The values of 1 pl/mm (pair lines/mm), 2 pl/mm and 3 pl/mm indicate frequencies of black and white stripe signals on the Braun tube and represent 137 TV lines, 274 TV lines and 411 TV lines, respectively.

For TV pictures, the view point is in many cases located near the center. Accordingly, the picture quality of the central portion becomes more important than that of the peripheral portion. As evident from FIGS. 3 to 6, a major feature of the optical system according to the present invention is that little deterioration is found in the area ranging from the central portion to the picture angle of 50%. Further, the MTF characteristics of the peripheral portion are also much better than those of lenses for domestic projection television receivers in use now.

Figure 7:
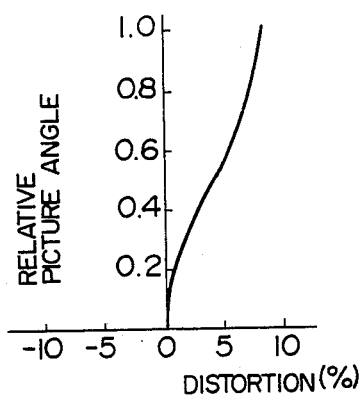
FIG. 7 is a distortion characteristic diagram of an embodiment according to the present invention.

FIG. 7 shows the distortion obtained for the embodiment shown in Table 1.

Since mearly the same tendency is found in other embodiments, the resulting distortion will now be described by taking this embodiment as a representative one.

In case of television sets, compensation by a circuit and compensation by the deflection yoke are applied to the distortion. The distortion, if any, appears on the picture as a raster distortion and linearity deterioration. Especially, the raster distortion poses a problem.

Figure 8:
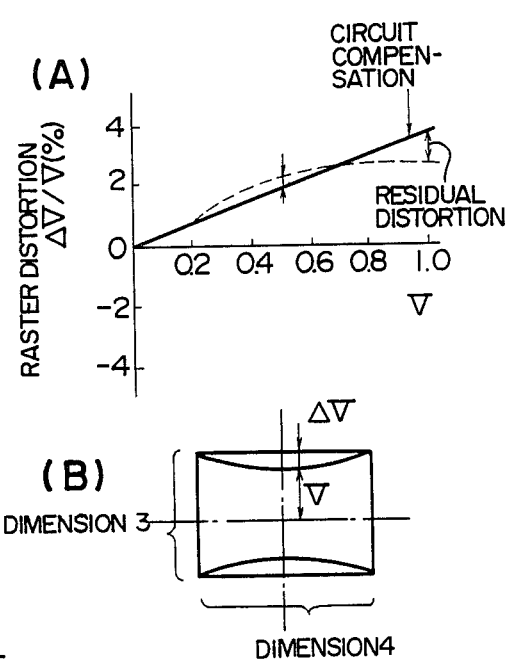
FIGS. 8(a) and (b) and 9 (a) and (B) are raster distortion characteristic diagrams of embodiments according to the present invention.
Figure 9:
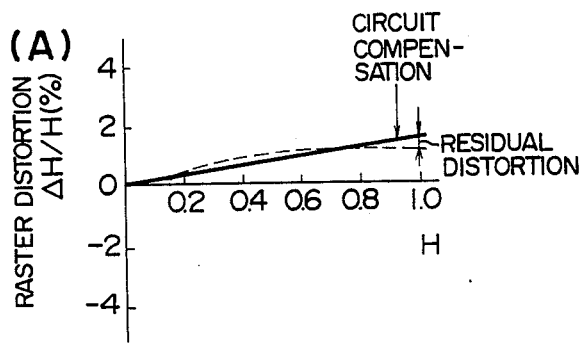
Figure 9:
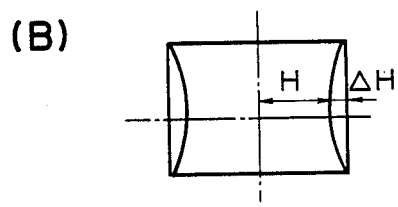

FIGS. 8 and 9 show the raster distortion resulting from the distortion shown in FIG. 7. FIG. 8 shows the raster distortion in the vertical direction. FIG. 9 shows the raster distortion in the horizontal direction.

In FIGS. 8 and 9, (A) represents the characteristics and (B) shows dimensions in the picture plane.

As described before, most projection television sets now in use have circuits for compensating raster distortion. However, this compensation circuit provides linear compensation proportioned to the picture angle. It is difficult to compensate nonlinear patterns. An attempt to compensate a nonlinear pattern results in an increased cost.

In FIGS. 8 and 9, the raster distortion after circuit compensation is shown as residual distortion. It is seen in these figures that the residual distortion is 1% or less in the same way as the conventional lens, posing no problem.

Table 5 summarizes quantities listed below for the embodiments of Tables 1 to 5.

TABLE 5

| Embodiments | $P_1/P_0$ | $P_2/P_0$ | $P_3/P_0$ | t/f |
|---|---|---|---|---|
| 1 (Table 1) | 0.10 | 0.88 | 0.40 | 0.26 |
| 2 (Table 2) | 0.14 | 0.88 | 0.30 | 0.34 |
| 3 (Table 3) | 0.22 | 0.92 | 0.22 | 0.28 |
| 4 (Table 4) | 0.12 | 0.88 | 0.37 | 0.29 |

1 The ratio $P_1/P_0$ between power $P_1$ (reciprocal of the focal distance) of the first lens 13 and power $P_0$ of the whole optical system.
2 The ratio $P_2/P_0$ between power $P_2$ of the second lens 14 and power $P_0$ of the whole optical system.
3 The ratio $P_3/P_0$ between power $P_3$ of the third lens 15 and power $P_0$ of the whole optical system.
4 The ratio t/f of the distance t between the third lens 15 and the fourth lens 16 to the focal distance f of the whole optical system.

It is seen in Table 5 that relations $$0.05 < P_1/P_0 < 0.25$$
$$0.85 < P_2/P_0 < 0.95$$
$$0.2 < P_3/P_0 < 0.45$$
$$0.25 < t/f < 0.35$$

hold true.

In any of embodiments shown in Tables 1 to 4, the second lens 14 is composed of a glass lens having a spherical shape. If a plastic lens is used, the image face is shifted and the focus is deteriorated because of a change in refractive index caused by a change in temperature or a change in shape caused by thermal expansion. In accordance with the present invention, the glass lens (the second lens 14 in the concrete form) is provided with large power as a countermeasure. The fourth lens 16 is also composed of glass lens having a spherical shape.

This aims at simplify the coupling structure between the lens and the Braun tube face to improve the reliability and cut the cost.

If this lens is made of plastic, the reliability is lowered as described below. For example, the plastic lens may be attacked by the cooling liquid and its surface may be degenerated. Or the plastic lens may have a high temperature and may be subjected to thermal deformation, because the plastic lens is located near the fluorescent face having high luminance and a high temperature. Occurrence of these problems results in the lowered reliability.

Figure 10:
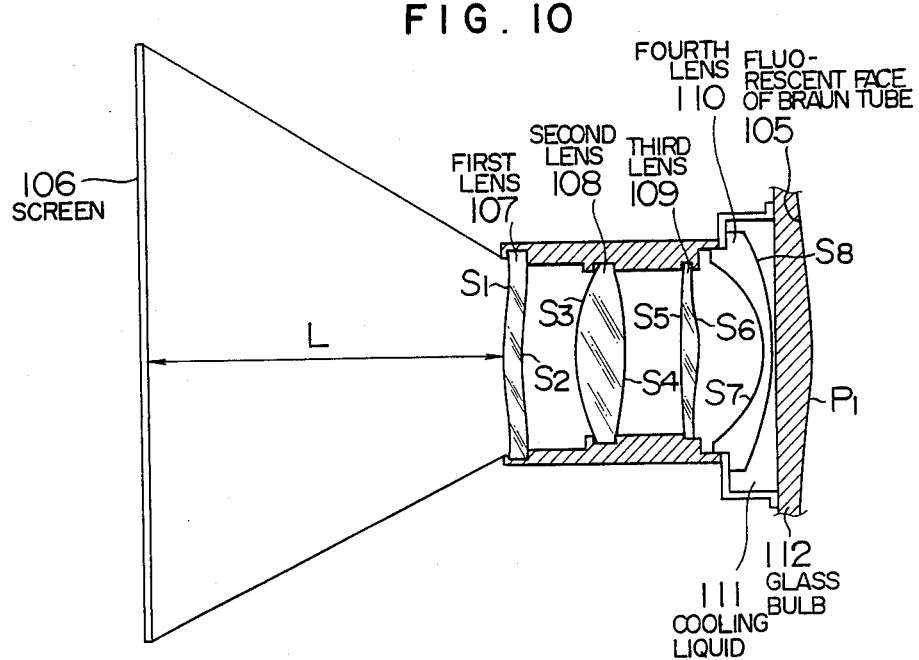
FIG. 10 is a sectional view of another embodiment according to the present invention.
Figure 11:
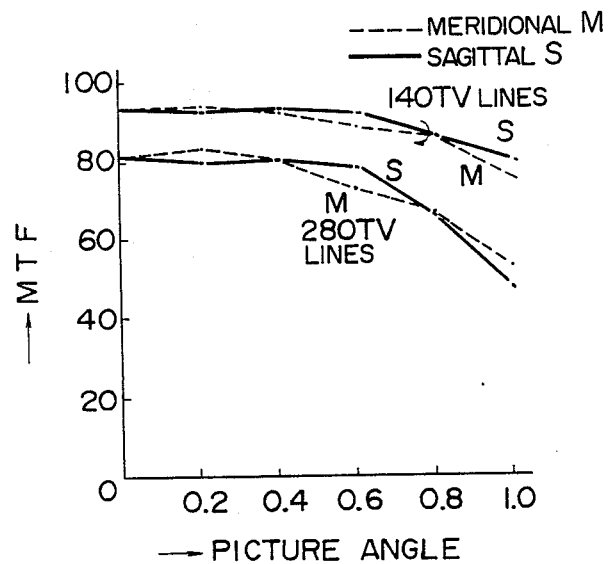
FIGS. 11 to 14 are characteristic diagrams illustrating MTF characteristic of the embodiment shown in FIG. 10.
Figure 12:
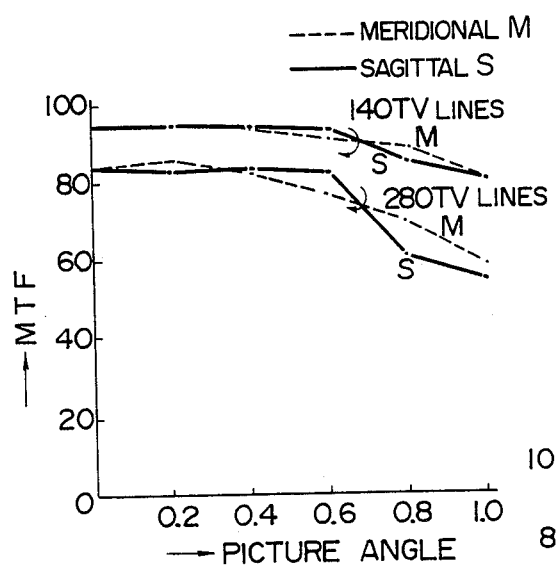
Figure 13:
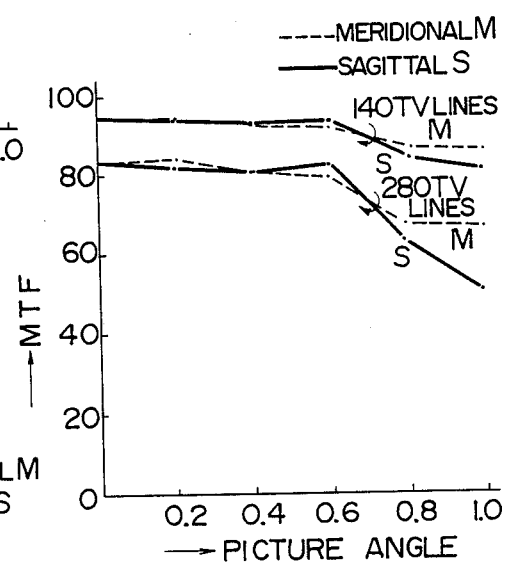
Figure 14:
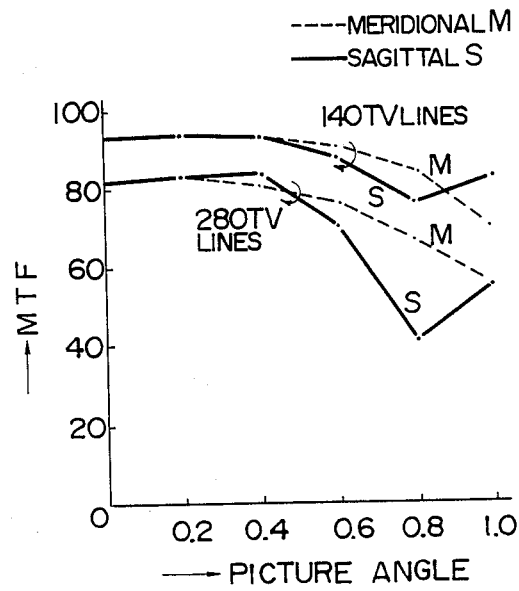

FIG. 10 shows another embodiment of the present invention.

A fluorescent face 105 of Braun tube, a screen 106, a first lens 107, a second lens 108, a third lens 109, a fourth lens 110, cooling liquid 111, and a glass bulb 112 are illustrated in FIG. 10.

The optical system shown in FIG. 10 is so configured as to exhibit the best performance when the raster having a length of 4.5 inch on the fluorescent face 105 of Braun tube is enlarged to a raster having a length of 45 inch on the screen 106, i.e., when the magnification is 10. The distance from the first lens 107 to the screen 106, which is the so-called projection distance, is 700 mm. The picture angle is approximately 40 degrees. It is understood that an ultrawide angle lens is formed as compared with the projection distance of 1,200 mm and the picture angle of approximately 25 degrees of the conventional lens system.

The first lens 107 has a nonspherical shape to eliminate the spherical aberration based upon the aperture. The second lens 108 is composed of a glass lens in order to decrease the focus drift caused by a temperature change and is provided with power as much as possible. The third lens 109 has a nonspherical shape in order to eliminate the high order coma and astigmatism and is provided with power as little as possible. The fourth lens 110 is a lens for compensating the curve of the image face. Since the fourth lens 110 is subjected to heat generated by the Braun tube as described before, it is made of glass to withstand the heat. In order to cut the cost as much as possible, the fourth lens 110 is formed as a concave meniscus lens.

The fluorescent face 105 of the Braun tube is provided with curvature in order to compensate the curvature of field. The fluorescent face 105 has a nonspherical shape especially for compensating the high order curve of the image face. In general, the fluorescent face side of the Braun tube undergoes only the press working and does not undergo the subsequent working. In spite of the nonspherical shape, therefore, the manufacturing method is not changed. In the central portion, the lens system (optical system) according to the present invention has nearly zero spherical aberration and produces only the color aberration. As compared with the lens system described in the aforementioned U.S. Pat. No. 4,300,817, the color aberration is reduced by the ratio of 700/1,200 and the center focus is improved by approximately 40%.

The plastic lens used in the present lens system has very little power. That is to say, the lens is thin and the thickness difference between the center and the periphery is small. Thus the lens can be easily formed. The concrete lens data which can be assumed by the present lens system are shown in Tables 6 to 9. In every table, the F number is 1.0 and very high luminance is achieved. The picture angle is 40 degrees.

TABLE 6

|  |  |  | Radius of Curvature (RD) | Clap Radius | Space Between Faces | Refractive Index |
|---|---|---|---|---|---|---|
| Paraxial system | Screen |  | ∞ | 600 |  |  |
|  |  |  |  |  | 701.0 | 1.0 |
|  | First | $S_1$ | 89.5209 | 40.0 |  |  |
|  |  |  |  |  | 7.049 | 1.4936 |
|  | Lens | $S_2$ | 144.387 | 36.5 |  |  |
|  |  |  |  |  | 21.124 | 1.0 |
|  | Second | $S_3$ | 75.429 | 34.0 |  |  |
|  |  |  |  |  | 18.3 | 1.59096 |
|  | Lens | $S_4$ | −114.739 | 31.5 |  |  |
|  |  |  |  |  | 21.392 | 1.0 |
|  | Third | $S_5$ | 795.357 | 34.0 |  |  |
|  |  |  |  |  | 6.012 | 1.4936 |
|  | Lens | $s_6$ | −155.305 | 34.0 |  |  |
|  |  |  |  |  | 25.6 | 1.0 |
|  | Fourth | $S_7$ | −38.854 | 34.5 |  |  |
|  | Lens | $S_8$ | −100.0 | 65.0 | 3.0 | 1.51827 |
|  | Cooling |  |  |  | 1.939 | 1.41 |
|  | Liquid |  | ∞ | 65.0 |  |  |
|  | Glass |  |  |  | 13.3 | 1.5401 |
|  | Fluorescent Face $P_1$ |  | 171.05 | 65.0 |  |  |

|  |  |  | CC | AD | AE | AF | AG |
|---|---|---|---|---|---|---|---|
| Aspherical coefficients | First | $S_1$ | −3.5246 | $\times 10^{-6}$ −1.4882 | $\times 10^{-9}$ −3.3451 | $\times 10^{-12}$ 2.5818 | $\times 10^{-16}$ −5.5038 |
|  | Lens | $S_2$ | 2.6171 | $\times 10^{-6}$ −1.4875 | $\times 10^{-9}$ −2.6763 | $\times 10^{-12}$ 2.6856 | $\times 10^{-16}$ −6.0086 |
|  | Third | $S_5$ | −254.18 | $\times 10^{-7}$ 6.5455 | $\times 10^{-10}$ −3.3198 | $\times 10^{-13}$ 8.2570 | $\times 10^{-16}$ −3.5901 |
|  | Lens | $S_6$ | −8.0572 | $\times 10^{-6}$ 1.0179 | $\times 10^{-10}$ 7.8019 | 0 | 0 |
|  | Fluorescent | $P_1$ | −1.7 | $\times 10^{-7}$ 5.295 | $\times 10^{-11}$ 5.063 | $\times 10^{-14}$ −4.033 | $\times 10^{-18}$ 4.0551 |

TABLE 7

|  |  |  | Radius of Curvature (RD) | Clap Radius | Space Between Faces | Refractive Index |
|---|---|---|---|---|---|---|
| Paraxial | Screen |  | ∞ | 600 |  |  |
|  |  |  |  |  | 701.0 | 1.0 |
|  | First | $S_1$ | 93.390 | 40.0 |  |  |
|  |  |  |  |  | 7.049 | 1.4936 |
|  | Lens | $S_2$ | 133.892 | 37.5 |  |  |
|  |  |  |  |  | 18.843 | 1.0 |

TABLE 7-continued

|  |  |  | | | | |
|---|---|---|---|---|---|---|
|  | Second | $S_3$ | 77.574 | 34.0 | | |
|  |  |  |  |  | 17.3 | 1.59096 |
|  | Lens | $S_4$ | −106.273 | 32.0 | | |
|  |  |  |  |  | 24.974 | 1.0 |
|  | Third | $S_5$ | 249.038 | 34.0 | | |
|  |  |  |  |  | 8.012 | 1.4936 |
|  | Lens | $S_6$ | −208.647 | 34.0 | | |
|  |  |  |  |  | 22.6 | 1.0 |
|  | Fourth | $S_7$ | −38.823 | 35.0 | | |
|  | Lens | $S_8$ | −100.0 | 65.0 | 3.0 | 1.51827 |
|  | Cooling |  |  |  | 2.0 | 1.41 |
|  | Liquid |  | ∞ | 65.0 | | |
|  | Glass |  |  |  | 13.8 | 1.5401 |
|  | Fluorescent |  | −155.52 | 65.0 | | |
|  | Face $P_1$ |  |  |  | | |

|  |  |  | CC | AD | AE | AF | AG |
|---|---|---|---|---|---|---|---|
| Aspherical coefficients | First Lens | $S_1$ | −4.8137 | $\times 10^{-6}$ −1.5886 | $\times 10^{-9}$ −3.3460 | $\times 10^{-12}$ 2.5926 | $\times 10^{-16}$ −5.6081 |
|  | | $S_2$ | 2.3921 | $\times 10^{-6}$ −1.5798 | $\times 10^{-9}$ −2.5927 | $\times 10^{-12}$ 2.6404 | $\times 10^{-16}$ −5.8014 |
|  | Third | $S_5$ | −68.5873 | $\times 10^{-7}$ 6.9339 | $\times 10^{-10}$ −5.6883 | $\times 10^{-13}$ −1.6146 | $\times 10^{-17}$ −5.1634 |
|  | Lens | $S_6$ | −143.9 | $\times 10^{-7}$ −8.3110 | $\times 10^{-9}$ 1.6224 | $\times 10^{-12}$ −1.2352 | $\times 10^{-16}$ 1.9594 |
|  | Fluorescent Face | $P_1$ | −3.0554 | $\times 10^{-7}$ 5.8835 | $\times 10^{-11}$ 5.625 | $\times 10^{-14}$ −4.4810 | $\times 10^{-18}$ 4.5061 |

TABLE 8

|  |  |  | Radius of Curvature (RD) | Clap Radius | Space Between Faces | Refractive Index |
|---|---|---|---|---|---|---|
| Paraxial system | Screen | ∞ | 600 | | | |
|  |  |  |  |  | 701.0 | 1.0 |
|  | First | $S_1$ | 91.375 | 40.0 | | |
|  |  |  |  |  | 7.049 | 1.4936 |
|  | Lens | $S_2$ | 136.144 | 37.5 | | |
|  |  |  |  |  | 18.453 | 1.0 |
|  | Second | $S_3$ | 79.961 | 34.0 | | |
|  |  |  |  |  | 17.3 | 1.59096 |
|  | Lens | $S_4$ | −104.859 | 32.0 | | |
|  |  |  |  |  | 24.496 | 1.0 |
|  | Third | $S_5$ | 246.480 | 34.0 | | |
|  |  |  |  |  | 8.012 | 1.4936 |
|  | Lens | $S_6$ | −182.659 | 34.0 | | |
|  |  |  |  |  | 22.6 | 1.0 |
|  | Fourth | $S_7$ | −40.024 | 35.0 | | |
|  | Lens | $S_8$ | −100.0 | 65.0 | 3.0 | 1.62325 |
|  | Cooling |  |  |  | 2.0 | 1.41 |
|  | Liquid |  | ∞ | 65.0 | | |
|  | Glass |  |  |  | 13.8 | 1.5401 |
|  | Fluorescent |  | −155.52 | 65.0 | | |
|  | Face $P_1$ |  |  |  | | |

|  |  |  | CC | AD | AE | AF | AG |
|---|---|---|---|---|---|---|---|
| Aspherical coefficients | First Lens | $S_1$ | −4.6508 | $\times 10^{-6}$ −1.6176 | $\times 10^{-9}$ −3.3670 | $\times 10^{-12}$ 2.5887 | $\times 10^{-16}$ −5.5889 |
|  | | $S_2$ | 2.2709 | $\times 10^{-6}$ −1.6139 | $\times 10^{-9}$ −2.5776 | $\times 10^{-12}$ 2.6319 | $\times 10^{-16}$ −5.8520 |
|  | Third | $S_5$ | −156.527 | $\times 10^{-6}$ 1.3274 | $\times 10^{-10}$ −2.1805 | $\times 10^{-13}$ −2.2953 | $\times 10^{-17}$ 3.2074 |
|  | Lens | $S_6$ | −34.167 | $\times 10^{-8}$ −7.2389 | $\times 10^{-9}$ 1.5732 | $\times 10^{-13}$ −9.1082 | $\times 10^{-16}$ 1.2742 |
|  | Fluorescent Face | $P_1$ | −3.0554 | $\times 10^{-7}$ 5.8835 | $\times 10^{-11}$ 5.6250 | $\times 10^{-14}$ −4.4810 | $\times 10^{-18}$ 6.5061 |

TABLE 9

|  |  |  | Radius of Curvature (RD) | Clap Radius | Space Between Faces | Refractive Index |
|---|---|---|---|---|---|---|
| Paraxial system | Screen | ∞ | 600 | | | |
|  |  |  |  |  | 701.0 | 1.0 |
|  | First | $S_1$ | 70.4536 | 37.0 | | |
|  |  |  |  |  | 9.745 | 1.4936 |
|  | Lens | $S_2$ | 100.427 | 35.5 | | |
|  |  |  |  |  | 19.175 | 1.0 |
|  | Second | $S_3$ | 74.577 | 34.0 | | |

TABLE 9-continued

| | | | | 17.3 | 1.5909 |
|---|---|---|---|---|---|
| Lens | S₄ | −113.749 | 32.0 | | |
| | | | | 23.66 | 1.0 |
| Third | S₅ | 633.047 | 34.0 | | |
| | | | | 5.012 | 1.4936 |
| Lens | S₆ | −155.560 | 34.0 | | |
| | | | | 23.0 | 1.0 |
| Fourth | S₇ | −38.221 | 34.5 | | |
| Lens | S₈ | −100.0 | 65.0 | 3.0 | 1.51827 |
| Cooling | | | | 4.2 | 1.41 |
| Liquid | | ∞ | 65.0 | | |
| Glass | | | | 12.4 | 1.5401 |
| Fluorescent | | −224.52 | 65.0 | | |
| Face P₁ | | | | | |

| | | | CC | AD | AE | AF | AG |
|---|---|---|---|---|---|---|---|
| Aspherical coefficients | First Lens | S₁ | −3.7652 | $\times 10^{-7}$ −5.2558 | $\times 10^{-9}$ −1.3265 | $\times 10^{-13}$ −2.8979 | $\times 10^{-16}$ 3.1657 |
| | | S₂ | −2.7480 | $\times 10^{-7}$ −4.5675 | $\times 10^{-10}$ −9.1198 | $\times 10^{-13}$ −1.3062 | $\times 10^{-16}$ 3.4793 |
| | Third | S₅ | −4555.890 | $\times 10^{-6}$ 1.4793 | $\times 10^{-9}$ −1.8907 | $\times 10^{-12}$ 1.8922 | $\times 10^{-16}$ −5.3263 |
| | Lens | S₆ | −37.727 | $\times 10^{-7}$ 3.6028 | $\times 10^{-10}$ 8.2319 | $\times 10^{-14}$ 1.7245 | $\times 10^{-16}$ 1.8408 |
| | Fluorescent Face | P₁ | −14.689 | $\times 10^{-7}$ 3.924 | $\times 10^{-12}$ −8.312 | $\times 10^{-14}$ −1.6010 | $\times 10^{-20}$ 2.4631 |

The screen 106 is ∞ in radius of curvature. (That is to say, the screen 106 is a flat plane.) The effective radius (clap radius) assured in the optical performance is 600 mm. The distance on the optical axis from the screen face to the face S1 of the first lens 107 (denoted by the term "space between faces") is 701.0 mm. The refractive index (of the air) between those faces is 1.0.

The face S1 of the first lens 107 has a radius of curvature of 89.5209 mm. The clap radius (effective radius in the view of optical performance) is 40.0 mm. The space on the optical axis between the lens faces S1 and S2 (represented as "space between faces") is 7.049 mm. The refractive index between those faces is 1.4936.

It is shown that the fluorescent face 105 (P1) of the glass bulb 112 is −171.05 mm in radius of curvature and 65.0 mm in clap radius. The glass bulb 112 has thickness of 13.3 mm on the optical axis and refractive index of 1.5401.

Nonspherical coefficients are shown for faces S1 and S2 of the first lens 107, faces S5 and S6 of the third lens 109, and the fluorescent face 105 (P1).

As described before, the aspherical coefficients are coefficients obtained when the face shape is represented as $$Z = \frac{r^2/R_D}{1 + \sqrt{1 - (CC) \cdot r^2/R_D^2}} + AD \cdot r^4 + AE \cdot r^6 + AF \cdot r^8 + AG \cdot r^{10}$$

where Z represents the height of the lens face (as a function of r) when the direction of the optical axis is taken as the Z axis and the radial direction of the lens is taken as the r axis as shown in FIG. 2, and r and $R_D$ represent the distance in the radial direction and the radius of curvature, respectively. If coefficients CC, AD, AE, AF and AG are given, therefore, the height, i.e., the shape of the lens face is defined by the above expression.

Since the second lens 108 and the fourth lens 110 of FIG. 10 are spherical lenses, all of their non-spherical coefficients are zero.

In the optical system according to the present invention, it becomes possible to largely shorten the projection distance and improve the focus performance as compared with the prior art by using lenses and the Braun tube configured as heretofore described. FIGS. 11 to 14 show the focus characteristics estimated by using MTF (modulation transfer function) when an image of 4.5 inch on the fluorescent face is so projected onto the screen as to be enlarged to an image of 45 inch by using the optical system according to the present invention heretofore described. Characteristics shown in FIGS. 11 to 14 correspond to Tables 6 to 9, respectively.

Data are plotted for 140 TV lines and 280 TV lines taken as the frequency of black and white stipe signals on the Braun tube.

When averaged for all picture angles, the MTF characteristics of 280 TV lines are improved by 50% or more as compared with those described in U.S. Pat. No. 4,526,442.

Figure 15:
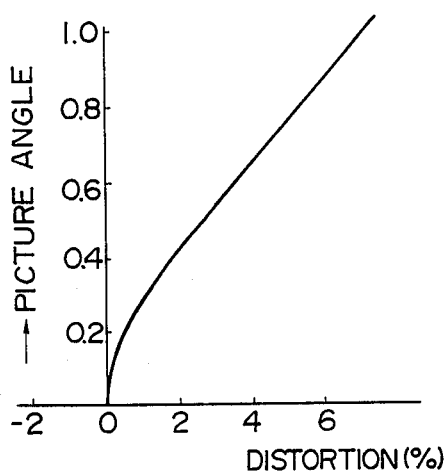
FIG. 15 is a distortion characteristic diagram of an embodiment according to the present invention.

FIG. 15 is a distortion characteristic diagram for the embodiment shown in Table 6.

For other embodiments as well, similar values are obtained. FIG. 15 shows a somewhat large value 7.3% of distortion. However, the distortion characteristics follow a monotonic function. By generating barrel distortion on the Braun tube, it is possible to eliminate the distortion and generate a raster on the screen without distortion.

The barrel distortion can be generated by letting flow a compensation current through the deflection yoke or letting flow a compensation current through the convergence yoke disposed at the rear part of the deflection yoke.

In the optical system according to the present invention, the projection distance is reduced as compared with the conventional optical system and at the same time the overall dimensions are also significantly reduced. Both the length and aperture of the lens system are shortened by 30 to 50% as compared with those described in U.S. Pat. No. 4,526,442.

As a result, it becomes possible to realize an inexpensive lens system and a compact projection television set.

Assuming that powers of the whole system, the first lens, the second lens, the third lens and the fourth lens are respectively $P_0$, $P_1$, $P_2$, $P_3$ and $P_4$ in the embodiments shown in Tables 6 to 9, relations shown in Table 10 hold true.

TABLE 10

| Embodiments | $P_1/P_0$ | $P_2/P_0$ | $P_3/P_0$ | $P_4/P_0$ |
| --- | --- | --- | --- | --- |
| 1 (Table 6) | 0.15 | 0.88 | 0.27 | 0.86 |
| 2 (Table 7) | 0.13 | 0.88 | 0.30 | 0.84 |
| 3 (Table 8) | 0.13 | 0.88 | 0.32 | 0.93 |
| 4 (Table 9) | 0.16 | 0.89 | 0.28 | 0.87 |

That is to say, it is understood that the following relations hold true:

$$0.1 < P_1/P_0 < 0.19$$
$$0.86 < P_2 P_0 < 0.9$$
$$0.25 < P_3/P_0 < 0.33$$
$$0.82 < P_4/P_0 < 0.95$$

The nonspherical shape of the fluorescent face can be described by referring to FIG. 16 as follows.

Figure 16:
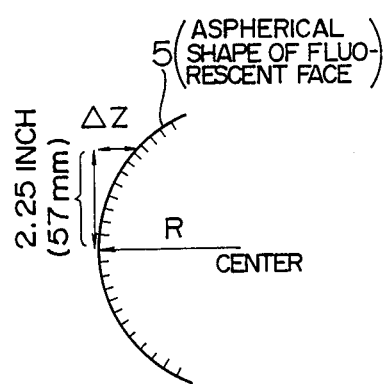
FIG. 16 is a diagram for illustrating the nonspherical shape of the fluorescent face.

FIG. 16 is a diagram for illustrating the nonspherical shape of the fluorescent face. As shown in FIG. 16, the radius of curvature on the center axis is represented by R. Assume that a first point is located on the fluorescent face and is 2.25 inch or 57 mm from the center in the direction perpendicular to the central axis. And assume a second point is located on the intersection of the central axis and the fluorescent face. The deviation in the central axis direction between the first point and the second point is represented by $\Delta Z$. If the fluorescent face is spherical, the relation $$\Delta Z = (57^2)/(2R)$$

holds true. In this case, however, the fluorescent face is not spherical but nonspherical. Therefore, the above relation does not hold true and slight deviation is caused. Letting $(57^2)/(2R) = \Delta Z_1$, Table 11 compares the actual values of $\Delta Z$ with $\Delta Z_1$ to show the shift for respective embodiments shown in Tables 6 to 9.

TABLE 11

| Embodiments | R | $\Delta Z_1 = \frac{57^2}{2R}$ | $\Delta Z$ | $\Delta Z/\Delta Z_1$ |
| --- | --- | --- | --- | --- |
| Table 6 | ⊖171.05 | 9.50 | ⊖5.02 | 0.53 |
| Table 7 | ⊖155.5 | 10.4 | ⊖5.03 | 0.48 |
| Table 8 | ⊖155.5 | 10.4 | ⊖5.03 | 0.48 |
| Table 9 | ⊖224.5 | 7.24 | ⊖4.02 | 0.55 |

It is evident from the data shown in Table 11 that the following relations hold true:

$$0.4 < \Delta Z/\Delta Z_1 < 0.7$$
$$-300 < R < -100$$

We claim:

1. An optical system of a projection television receiver for projecting pictures from a picture tube onto a screen, comprising a tube face of the picture tube curved in such a direction as to compensate the curve of the image face of the projected picture on the screen, and further comprising lenses arranged from the screen side to the tube face of the receiver tube in the order of:

(A) a first lens having power (reciprocal of focal distance) $P_1$ related to power $P_0$ of the whole optical system as $$0.05 < P_1/P_0 < 0.25$$

(B) a second glass lens of biconvex form having power $P_2$ related to said $P_0$ as $$0.85 < P_2/P_0 < 0.95$$

(C) a third lens having power $P_3$ related to said $P_0$ as $$0.2 < P_3/P_0 < 0.45;\text{ and}$$

(D) a fourth lens comprising a concave lens disposed to compensate the curve of the image face of the projected picture on the screen;
wherein said third lens is spaced from said second glass lens by a distance larger than a thickness of said third lens.

2. An optical system of a projection television receiver according to claim 1, wherein the ratio of the distance t between the third lens and the fourth lens to the focal distance f of the whole optical system lies in the range $$0.25 < t/f < 0.35.$$

3. An optical system of a projection television receiver according to claim 1, wherein at least one face is nonspherical in each of the first lens and the third lens.

4. An optical system of a projection television receiver according to claim 1, wherein the fourth lens comprises spherical glass.

5. An optical system of a projection television receiver according to claim 1, wherein the space between the fourth lens and the tube face of the picture tube is filled with cooling liquid.

6. An optical system of a projection television receiver according to claim 1, wherein the distortion causing picture distortion on the screen lies in the range of $-5\%$ to $-9\%$ and forms a monotonically increasing function with respect to the picture angle.

7. An optical system for a projection system for projecting a picture reproduced on an image display device onto a screen, comprising from the screen side:
a first lens element having a weak power and aspherical surfaces at both sides;
a second glass lens element of biconvex form providing a majority of positive power of the overall optical system;
a third lens element of relatively weak positive peak having aspherical surfaces at both sides; and
a fourth lens element of negative power having a surface which is strongly concave to the screen side;
wherein $$0.85 < P_2/P_0 < 0.95$$

where $P_2$ is the power of said second glass lens element and $P_0$ is the power of the whole optical system, and said third lens element is spaced from said second glass lens element by a distance larger than a thickness of said third lens element.

8. An optical system according to claim 7, wherein $$0.05 < P_1/P_0 < 0.25$$

where P1 is the power of said first lens element and P0 is the power of the whole optical system.

9. An optical system according to claim 7, wherein $$0.2 < P3/P0 < 0.45$$

where P3 is the power of said third lens element and P0 is the power of the whole optical system.

10. A projection system comprising:
an image display device for reproducing a picture to be projected;
a screen; and
an optical means disposed between said image display device and said screen for projecting said picture onto said screen, said optical means comprising from the screen side,
a first lens element having a weak power and aspherical surfaces at both sides,
a second glass lens element of biconvex form providing a majority of positive power of the overall optical system,
a third lens element of relatively weak positive power having aspherical surfaces at both sides; and
a fourth lens element of negative power having a surface which is strongly concave to the screen side,
wherein $$0.85 < P_2/P_0 < 0.95$$

where P2 is the power of said second glass lens element and P0 is the power of the whole optical system and said third lens element is spaced from said second lens element by a distance larger than a thickness of said third lens element.

11. An projection system according to claim 10, wherein $$0.05 < P1/P0 < 0.25$$

where P1 is the power of said first lens element and P0 is the power of the whole optical system.

12. An projection system according to claim 10, wherein $$0.2 < P3/P0 < 0.45$$

where P3 is the power of said third lens element and P0 is the power of the whole optical system.

13. An optical system for a projection system for projecting a picture reproduced on a curved phosphor surface of a picture tube onto a screen, said curved phosphor surface being concave to the image end to contribute to correction of field curvature distortion in the projected picture which may be caused if the phosphor surface is plano, comprising from the screen side;
a first lens element having a weak power and aspherical surface at both sides;
a second glass lens element of biconvex form providing a majority of positive power of the overall optical system;
a third lens element of relatively weak positive power having aspherical surfaces at both sides; and
a fourth lens element of negative power having a surface which is strongly concave to the screen side;
wherein $$0.85 < P_2/P_0 < 0.95$$

where P2 is the power of said second glass lens element and P0 is the power of the whole optical system, and said third lens element is spaced from said second glass lens element by a distance larger than a thickness of said third lens element.

14. An optical system according to claim 13, wherein $$0.05 < P1/P0 < 0.25$$

where P1 is the power of said first lens element and P0 is the power of the whole optical system.

15. An optical system according to claim 13, wherein $$0.2 < P3/P0 < 0.45$$

where P3 is the power of said third lens element and P0 is the power of the whole optical system.

16. An optical system according to claim 13, wherein said curved phosphor surface is aspherical.

17. An optical system according to claim 13, further comprising coupling means connected between said fourth lens element and said picture tube and having a cooling liquid provided therein.

18. A projection system comprising:
a screen;
a picture tube having a curved phosphor surface on which a picture to be projected onto a screen is reproduced, said curved phosphor surface being concave to the image end to contribute to correction of field curvature distortion in a projected picture which may be caused if the phosphor surface is plano; and
an optical means disposed between said image display device and said screen for projecting said picture onto said screen, said optical means comprising from the screen side,
a first lens element having a weak power and aspherical surfaces at both sides,
a second glass lens element of biconvex form providing a majority of positive power of the overall optical system,
a third lens element of relatively weak positive power having aspherical surfaces at both sides, and
a fourth lens element of negative power having a surface which is strongly concave to the screen side;
wherein $$0.85 < P_2/P_0 < 0.95$$

where P2 is the power of said second glass lens element and P0 is the power of the whole optical system, and said third lens element is spaced from said second glass lens element by a distance larger than a thickness of said third lens element.

19. An projection system according to claim 18, wherein $$0.05 < P1/P0 < 0.25$$

where P1 is the power of said first lens element and P0 is the power of the whole optical system.

20. A projection system according to claim 18, wherein $$0.2 < P3/P0 < 0.45$$

where P3 is the power of said third lens element and P0 is the power of the whole optical system.

21. A projection system according to claim 18, wherein said curved phosphor surface is aspherical.

22. An optical system according to claim 18, further comprising coupling means connected between said fourth lens element and said picture tube and having a cooling liquid provided therein.

23. An optical system for projecting an image, comprising:
- a cathode ray tube having a face glass, said face glass having a convex surface to which a plurality of phoshor elements are mounted, side surface of said face glass to which said phosphor elements are mounted being aspheric;
- a first aspheric lens of relatively weak power;
- a second biconvex lens of glass for providing a major portion of enlargement provided by the optical system;
- a third aspheric lens of relatively weak positive power; and
- a fourth lens of relatively large negative power with a concave face on the screen side thereof;

wherein $$0.85 < P_2/P_0 < 0.95$$

where P2 is the power of said second lens and P0 is the power of the whole optical system, and said third lens is spaced from said second lens by a distance larger than a thickness of said third lens element.

24. An optical system for a projection television, comprising:
- a first lens element having a weak power and an aspherical surface;
- a second glass lens element of biconvex form providing a majority of the positive power of the overall optical system;
- a third lens element of relatively weak power having an aspherical surface; and
- a fourth lens element of negative power having a surface which is strongly concave to the screen side;

wherein $$0.85 < P_2/P_0 < 0.95$$

where P2 is the power of said second lens element and P0 is the power of the whole optical system, and said third lens element is spaced from said second lens element by a distance larger than a thickness of said third lens element.

* * * * *